US008122122B1

(12) United States Patent
Clingenpeel et al.

(10) Patent No.: US 8,122,122 B1
(45) Date of Patent: Feb. 21, 2012

(54) EVENT MONITORING AND COLLECTION

(75) Inventors: James E. Clingenpeel, Salt Lake City, UT (US); Brent E. Henry, Salt Lake City, UT (US)

(73) Assignee: Raytheon Oakley Systems, Inc., Salt Lake City, UT (US)

(*) Notice: Subject to any disclaimer, the term of this patent is extended or adjusted under 35 U.S.C. 154(b) by 421 days.

(21) Appl. No.: 11/556,942

(22) Filed: Nov. 6, 2006

Related U.S. Application Data

(60) Provisional application No. 60/734,886, filed on Nov. 8, 2005.

(51) Int. Cl.
*G06F 15/173* (2006.01)
(52) U.S. Cl. .................... 709/224; 709/203; 709/223
(58) Field of Classification Search .................... 714/48; 709/223–226
See application file for complete search history.

(56) References Cited

U.S. PATENT DOCUMENTS

| | | | | |
|---|---|---|---|---|
| 6,023,582 | A | 2/2000 | Rogers et al. ................. | 395/708 |
| 6,099,317 | A | 8/2000 | Bullwinkel et al. ........... | 434/118 |
| 6,529,954 | B1 | 3/2003 | Cookmeyer, II et al. ..... | 709/224 |
| 6,543,011 | B1 | 4/2003 | Schumacher et al. ......... | 714/45 |
| 6,662,226 | B1 * | 12/2003 | Wang et al. .................... | 709/224 |
| 6,668,325 | B1 | 12/2003 | Collberg et al. .............. | 713/194 |
| RE38,572 | E | 8/2004 | Tetro et al. .................... | 235/380 |
| 6,772,107 | B1 | 8/2004 | La Cascia, Jr. et al. ........ | 703/21 |
| 6,801,224 | B1 | 10/2004 | Lewallen ...................... | 345/746 |
| 6,832,367 | B1 | 12/2004 | Choi et al. .................... | 717/130 |
| 6,976,218 | B2 | 12/2005 | Stanford-Clark ............ | 715/744 |
| 6,996,068 | B1 | 2/2006 | Sherlock ....................... | 370/248 |
| 7,054,420 | B2 | 5/2006 | Barker et al. ............. | 379/88.25 |
| 7,308,446 | B1 | 12/2007 | Panigrahy et al. ................ | 707/6 |
| 7,418,733 | B2 | 8/2008 | Connary et al. ................ | 726/25 |
| 7,661,036 | B1 | 2/2010 | Clingenpeel et al. ........... | 714/47 |
| 7,730,011 | B1 | 6/2010 | Deninger et al. ................. | 707/3 |

(Continued)

FOREIGN PATENT DOCUMENTS

EP        1 389 862        2/2004

OTHER PUBLICATIONS

Van Blarcum, K. (2004), "Passive VoIP Call Recording" [White Paper], Retrieved from http://www.audiocodes.com/library/type=39591/page=1/search= passive% 20voip% 20call% 20recording, Dec. 6, 2004.

(Continued)

*Primary Examiner* — Ian N Moore
*Assistant Examiner* — Jackie Zuniga
(74) *Attorney, Agent, or Firm* — Daly, Crowley, Mofford & Durkee, LLP

(57) ABSTRACT

Embodiments of the invention provide systems, software and methods for monitoring events on a computer. In a set of embodiments, a monitoring application monitors events on a monitored computer. Each of the monitored events may be analyzed, and based on the analysis, some or all of the monitored events may be collected. A variety of rules may be used in analyzing events. In some cases, collected events can be queued, for example, by storing a representation of each collected event in an event cache. When connectivity with a monitoring computer is available, a connection with the monitoring computer may be established, and/or the queued events may be transmitted to the monitoring computer. In a particular set of embodiments, the monitoring application is designed to avoid detection by a user of the monitored computer.

39 Claims, 8 Drawing Sheets

U.S. PATENT DOCUMENTS

| | | | | |
|---|---|---|---|---|
| 2001/0040942 | A1 | 11/2001 | Glowny et al. | 379/88.22 |
| 2001/0043685 | A1 | 11/2001 | Bscheider et al. | 379/88.22 |
| 2003/0009418 | A1 | 1/2003 | Green et al. | 705/38 |
| 2003/0033545 | A1 | 2/2003 | Wenisch et al. | 713/202 |
| 2003/0053420 | A1 | 3/2003 | Duckett et al. | 370/252 |
| 2003/0074440 | A1 | 4/2003 | Grabarnik et al. | 709/224 |
| 2003/0101235 | A1 | 5/2003 | Zhang | 709/218 |
| 2003/0123447 | A1 | 7/2003 | Smith | 370/394 |
| 2003/0216988 | A1 | 11/2003 | Mollett et al. | 705/35 |
| 2004/0111479 | A1 | 6/2004 | Borden et al. | 709/206 |
| 2004/0153287 | A1* | 8/2004 | Kirshenbaum et al. | 702/187 |
| 2005/0060719 | A1 | 3/2005 | Gray et al. | 719/318 |
| 2005/0071760 | A1 | 3/2005 | Jaeger | 715/705 |
| 2005/0183143 | A1* | 8/2005 | Anderholm et al. | 726/22 |
| 2006/0085691 | A1 | 4/2006 | Rivera et al. | 714/39 |
| 2006/0095569 | A1* | 5/2006 | O'Sullivan | 709/224 |
| 2006/0126817 | A1 | 6/2006 | Beckett, II et al. | 379/265.06 |
| 2006/0149674 | A1 | 7/2006 | Cook et al. | 705/44 |
| 2006/0190489 | A1 | 8/2006 | Vohariwatt et al. | 707/104.1 |
| 2006/0203807 | A1 | 9/2006 | Kouretas et al. | 370/352 |
| 2006/0271827 | A1* | 11/2006 | Cascaval et al. | 714/39 |
| 2006/0282270 | A1 | 12/2006 | Sheets et al. | 705/1 |
| 2007/0027785 | A1 | 2/2007 | Lent et al. | 705/35 |
| 2007/0028297 | A1 | 2/2007 | Troyansky et al. | 726/2 |
| 2007/0050844 | A1 | 3/2007 | Lebel | 726/13 |
| 2007/0143455 | A1* | 6/2007 | Gorman et al. | 709/223 |

OTHER PUBLICATIONS

Baker, Foster, Sharp, "Cisco Architecture for Lawful Intercept in IP Networks", IETF Standard-Working-Draft, Oct. 2003, ISSN: 0000-0004, XP0150010527; (pp. 1-16), Oct. 2003.

Baker, "Cisco Lawful Intercept Control MIB draft-baker-slem-mib-00", IETF . . . Apr. 2003, ISSN: 0000-0004, XP015000178; (pp. 1-38).

USPTO; Office Action, U.S. Appl. No. 11/556,968, filed Nov. 6, 2006, in the name of Brent E. Henry, (18 pgs), Notification Date Jun. 24, 2010.

USPTO; Office Action, U.S. Appl. No. 11/556,968, filed Nov. 6, 2006, in the name of Brent E. Henry, (12 pgs), Notification Date Dec. 8, 2010.

USPTO; Office Action, U.S. Appl. No. 11/557,007, filed Nov. 6, 2006, in the name of Brent E. Henry, (21 pgs), Notification Date Dec. 8, 2009.

USPTO; Office Action, Appl. No. 11/557,007, filed Nov. 6, 2006, in the name of Brent E. Henry, (21 pgs), Notification Date Jun. 11, 2010.

USPTO; Final Office Action, U.S. Appl. No. 11/557,007, filed Nov. 6, 2006, in the name of Brent E. Henry, (22 pgs), Notification Date Dec. 10, 2010.

USPTO; Office Action, U.S. Appl. No. 11/557,025, filed Nov. 6, 2006, in the name of James E. Clingenpeel, (7 pgs) Notification Date Mar. 18, 2009.

USPTO; Notice of Allowance and Fee(s) Due for U.S. Appl. No. 11/557,025, filed Nov. 6, 2006, in the name of James E. Clingenpeel, (4 pgs), Notification Date Sep. 1, 2009.

USPTO; Office Action, U.S. Appl. No. 11/556,984, filed Nov. 6, 2006, in the name of Michael Rogers, (33 pgs), Notification Date Aug. 4, 2010.

USPTO; Office Action, U.S. Appl. No. 11/556,984, filed Nov. 6, 2006, in the name of Michael Rogers, (32 pgs), Notification Date Feb. 24, 2010.

USPTO; Final Office Action, U.S. Appl. No. 11/556,984, filed Nov. 6, 2006, in the name of Michael Rogers, (28 pgs) Notification Date May 14, 2009.

USPTO; Office Action, U.S. Appl. No. 11/556,984, filed Nov. 6, 2006, in the name of Michael Rogers, (27 pgs), Notification Sep. 4, 2008.

USPTO; Final Office Action, U.S. Appl. No. 11/556,984, filed Nov. 6, 2006, in the name of Michael Rogers, (40 pgs), Notification Date Dec. 27, 2010.

USPTO; Office Action, U.S. Appl. No. 11/557,047, filed Nov. 6, 2006, in the name of Greg S. Neath, (21 pgs), Notification Date Apr. 2, 2010.

USPTO; Office Action, U.S. Appl. No. 11/557,047 filed Nov. 6, 2006, in the name of Greg S. Neath, (25 pgs), Notification Date Nov. 1, 2010.

USPTO; Office Action, U.S. Appl. No. 11/557,007, filed Nov. 6, 2006, in the name of Brent E. Henry, mailed Jul. 8, 2011 (30 pgs), Jul. 8, 2011.

Brent E. Henry, U.S. Appl. No. 11/557,007, "Response to 37. C.F.R. § 1.111", filed Oct. 10, 2011 (16 pgs), Oct. 10, 2011.

* cited by examiner

EVENT MONITORING AND COLLECTION

CROSS-REFERENCE TO RELATED APPLICATIONS

The present disclosure may be related to the following commonly assigned applications/patents:

This application claims priority from commonly-assigned provisional U.S. Patent Application No. 60/734,886, entitled "Event Monitoring and Collection," and filed Nov. 8, 2005 by Clingenpeel et al.

This application is related to commonly-assigned U.S. patent application Ser. No. 11/556,968, entitled "Replaying Events Collected from a Client Computer," and filed on a date even herewith by Henry, which claims priority from provisional U.S. Patent Application No. 60/734,811, entitled "Replaying Events Collected from a Client Computer," and filed Nov. 8, 2005 by Henry.

This application is related to commonly-assigned U.S. patent application Ser. No. 11/557,007, entitled "Keyword Obfuscation," and filed on a date even herewith by Henry et al., which claims priority from provisional U.S. Patent Application No. 60/734,909, entitled "Keyword Obfuscation," and filed Nov. 8, 2005 by Henry et al.

This application is related to commonly-assigned U.S. patent application Ser. No. 11/557,025, entitled "Cache for Collecting Events on a Monitored Computer," and filed on a date even herewith by Clingenpeel et al., which claims priority from provisional U.S. Patent Application No. 60/734,887, entitled "Cache for Collecting Events on a Monitored Computer," and filed Nov. 8, 2005 by Clingenpeel et al.

This application is related to commonly-assigned U.S. patent application Ser. No. 11/556,984, entitled "Validation of Social Security Numbers," and filed on a date even herewith by Rogers, which claims priority from provisional U.S. Patent Application No. 60/734,812, entitled "Validation of Social Security Numbers," and filed Nov. 8, 2005 by Rogers.

This application is related to commonly-assigned U.S. patent application Ser. No. 11/557,047, entitled "Monitoring and Collection of Audio Events," and filed on a date even herewith by Neath et al., which claims priority from provisional U.S. Patent Application No. 60/734,911, entitled "Monitoring and Collection of Audio Events," and filed Nov. 8, 2005 by Neath et al.

The respective disclosures of these applications/patents are incorporated herein by reference in their entirety for all purposes.

FIELD OF THE INVENTION

The present invention relates to computer systems in general and in particular to systems, methods and software for monitoring events on a computer system.

BACKGROUND OF THE INVENTION

In most modern organizations, almost all important information is stored in electronic form, across a variety of computer networks, servers, and other information systems. Trusted users inside an organization often have access to confidential and protected information. Consequently, organizations often employ a variety of security mechanisms to prevent unauthorized access to and/or use of such information.

Merely by way of example, many corporations have information security policies, which, in many cases, prohibit the use of floppy disk drives in corporate computer, require employees to check in and/or out any computing assets and/or media when entering/leaving the premises of the corporation, protect assets with firewalls, etc. In addition, there are a variety of ways, using computer hardware and/or software, for organizations to protect information. At the most basic level, physical access to information assets, such as servers, may be restricted. Similarly, logical access may be restricted, for instance by using software access controls (e.g., at the network level, operating system level and/or application level).

Of course, such security comes with a price: inconvenience to users. Moreover, in some cases, it is simply not possible to restrict access by all users, because inevitably, some users will need to have access to protected information, and it is difficult to both allow a user to access information and prevent that user from using the information for improper purposes.

Consider, for example, a corporation's financial information. If the corporation is publicly traded, such information must be protected until it is formally disclosed to the public. Otherwise, the information provides arbitrage opportunities, since it allows a holder of the information to anticipate the market effects of a public disclosure of the information and act accordingly. A certain set of users, however, must have access to the information. For example, the corporations accounting and finance personnel may need the information to perform their duties. Hence, it is infeasible to prevent such personnel from accessing the information, but that access presents a danger of improper use.

To combat such dangers, organizations generally are forced to rely on the trustworthiness of the personnel. Unfortunately, by the time an organization learns that an individual is untrustworthy, it is usually too late—the individual already has used the information for an improper purpose. There are some tools available that attempt to allow organizations to anticipate such untrustworthy actions, such as access monitors, keystroke loggers, and the like, but in many cases, a skilled user can detect and circumvent such controls.

Merely by way of example, if an organization prohibits the use of physical media, a user can make use of the Internet (including, for example, Internet-based email systems) to transfer information outside the organization. Anticipating this, many organizations use firewalls and proxies to detect and/or prevent the transfer of such information over the Internet. Skilled users, however, often can defeat such systems through the use of encryption, secure Internet protocols and the like to obfuscate their behavior. In other cases, a user may undertake questionable behavior when not currently connected to a network, such as copying a prohibited file onto a USB removable storage device.

There have been proposed a variety of monitoring systems for monitoring the activities of users on a monitored computer. In many cases, however, these monitoring systems are easily detected and/or circumvented. In other cases, monitoring systems require connectivity with a monitoring server in order to relay monitoring information to a monitoring party. Further, when implementing a monitoring system, there is a danger that events that may be related to an event of interest (that is, an event that should be captured for analysis and/or review) will be ignored merely because those related events occur before event of interest and thus appear innocuous and/or unworthy of collection. An alternative is to collect all events, but this alternative often imposes unreasonable overhead on the monitored system (e.g., in transmitting the events to a monitoring server for analysis) and thus often lead to detection by, and/or annoyance of, a user of the monitored computer.

BRIEF SUMMARY OF THE INVENTION

Embodiments of the invention provide systems, software and methods for monitoring events on a computer. In a set of embodiments, a monitoring application monitors events on a monitored computer. Each of the monitored events may be analyzed, and based on the analysis, some or all of the monitored events may be collected. A variety of rules may be used in analyzing events. In some cases, collected events can be queued, for example, by storing a representation of each collected event in an event cache. When connectivity with a monitoring computer is available, a connection with the monitoring computer may established, and/or the queued events may be transmitted to the monitoring computer. In a particular set of embodiments, the monitoring application is designed to avoid detection by a user of the monitored computer.

In one aspect of certain embodiments, a monitoring agent can provide more robust collection functionality than traditional monitoring systems. Merely by way of example, in a set of embodiments, a monitoring agent may store representations monitored events (and, in some cases, data associated with such representations) in an event cache, even, in some cases, before events have been analyzed or scored. This can allow the monitoring agent to collect prologue events, which may be related to the event of interest but which occurred prior in time to the event of interest. Hence, embodiments of the invention can provide the ability to capture events that, in the past, would have gone unnoticed.

In another aspect of certain embodiments, the event cache provided by certain embodiments can allow for the collection of events even when the monitored computer lacks connectivity with a monitoring server. Hence, events may be monitored even when the monitored computer is offline, such as in the case of a mobile computer, which may often be used in locations without network connectivity.

One set of embodiments provides systems, including without limitation systems for monitoring and/or collecting events on a monitored computer. In an embodiment, the system comprises a monitoring computer and a monitored computer. (It should be noted that, while the monitored computer may be in communication with the monitoring computer from time to time, some embodiments of the invention are configured to allow monitoring and/or collection of events even when the monitored computer is out of communication with the monitoring computer. In this way, various embodiments can accommodate mobile computing, such as when the monitored computer is a laptop, PDA, etc. and thus may not always have network connectivity. In addition, in some cases, the ability of the system to provide monitoring and/or collection of events even without connectivity with the monitoring computer can help avoid detection of the monitoring/collection by a user of the monitored computer.)

An exemplary monitoring computer may comprise a processor and a set of instructions executable by the processor. The set of instructions can include, variously, instruction to monitor a network for a connection by a monitored computer, instructions to receive a set of one or more representations of events occurring on the monitored computer, and/or instructions to analyze any received representations of events. In this way, for example, the monitoring computer can determine whether the events are associated with any improper activities by a user of the monitored computer (and/or another). Such improper activities can include, merely by way of example, accessing inappropriate content on the Internet, transferring confidential information from the monitored computer (e.g., via a network connection, via a USB drive and/or other removable media, etc.), and the like.

An exemplary monitored computer also comprises a processor and a set of instructions executable by the processor. In certain embodiments, the set of instructions may be incorporated within a monitoring agent on the monitored computer. This set of instructions can include, merely by way of example, instructions to monitor a plurality of events, each of which may occur at the monitored computer. In some cases, the set of instructions also includes instructions to store a representation of each of the plurality of events, perhaps in an event cache. One (or more) of the events on the monitored may be identified as requiring collection.

In certain embodiments, the monitored computer may also have instructions to determine a window of interest prior in time to the identified event, such that events falling within the window of interest should be collected. Of the plurality of events, one or more events falling within the window of interest may be identified.

In a particular embodiment, the monitored computer can further comprise instructions to queue the representations of the identified event and the one or more events falling within the window of interest, e.g., for transmission to the monitoring computer.

In another set of embodiments, a system for monitoring events on a monitored computer comprises a monitored computer having a processor and a set of instructions executable by the processor. In a particular embodiment, the set of instructions includes instructions to monitor a plurality of events, each of which may (and/or might) not be occurring at the monitored computer. Additionally, and/or alternatively, there may be an instruction to store a representation of each of the plurality of events, for example, in an event cache.

In some cases, the set of instructions further comprises instructions to analyze one or more of the plurality of events and/or to identify, for example, based on the analysis of the events, one or more events as requiring collection. In other cases, the set of instructions may comprise instructions to queue the representation(s) of the identified event(s) for transmission (e.g., to a monitoring computer). In some embodiments, then, the representations (and/or at least portions thereof) of identified events may be transmitted for reception by the monitoring computer.

Another set of embodiments comprises methods, including without limitation methods implemented by the systems described above. An exemplary method of monitoring events on a monitored computer comprises monitoring (perhaps with a software agent on the monitored computer) a plurality of events occurring on the monitored computer. For each of the monitored events, the method might further comprise generating a hash value corresponding to the monitored event, and/or searching an event cache for an existing hash value matching the generated hash value. If an existing has value matching the generated hash value is found in the event cache, the generated hash value may be stored as a representation of the monitored event. Conversely, if no existing hash value is found in the event cache, a copy of the monitored event, perhaps along with the generated hash value, may be stored in the cache as a representation of the event.

The method further comprises, in some embodiments, identifying one of the plurality of events are requiring collection and/or queuing the representation of the identified event(s) for transmission to a monitoring server. In a set of embodiments, the software agent can be configured such that actions performed by the software agent are not detectible by a user of the monitored computer.

Yet another set of embodiments comprises computer software programs, including without limitation software programs that perform the methods described above and/or are implemented in the systems described above. An exemplary computer program, for instance, may comprise instructions to monitor a plurality of events occurring on a computer (for example, the computer on which the software program is installed).

The program might further comprise instructions to store a representation of each of the plurality of events (e.g., in an event cache at the computer) and/or instructions to analyze one or more of the plurality of events to determine whether any of the plurality of events requires collection. Further instructions may be executable to identify one (or more) of the plurality of events on the computer as requiring collection, perhaps based on an analysis of each of the plurality of events. In an aspect, the program might further comprise instructions to determine that a set of one or more events occurring prior in time to the identified event should be collected and/or instructions to specify a window of interest prior in time to the identified event, such that events occurring during the window of interest should be collected. One or more events one or more events falling within the window of interest may be identified, and/or representations of such events may be queued, for transmission to a second computer.

DETAILED DESCRIPTION OF THE INVENTION

Figure 1:
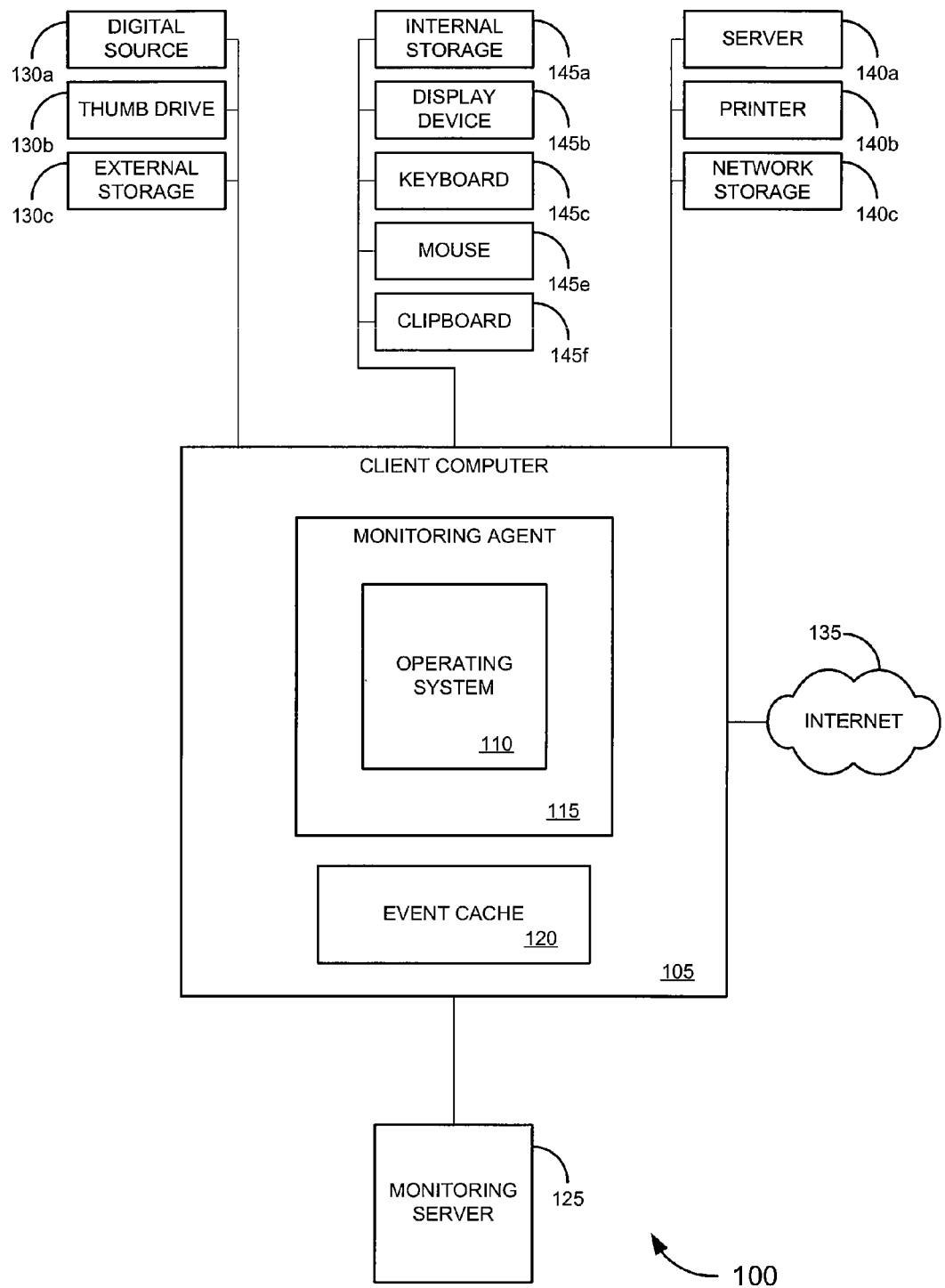
FIG. 1 is generalized schematic diagram illustrating a client computer in communication with a monitoring server and other assorted devices, in accordance with various embodiments of the invention.

Embodiments of the invention provide systems, software and methods for monitoring events on a computer. In a set of embodiments, a monitoring application monitors events on a monitored computer. Each of the monitored events may be analyzed, and based on the analysis, some or all of the monitored events may be collected. A variety of rules may be used in analyzing events. In some cases, collected events can be queued, for example, by storing a representation of each collected event in an event cache. When connectivity with a monitoring computer is available, a connection with the monitoring computer may established, and/or the queued events may be transmitted to the monitoring computer. In a particular set of embodiments, the monitoring application is designed to avoid detection by a user of the monitored computer.

In one aspect of certain embodiments, a monitoring agent can provide more robust collection functionality than traditional monitoring systems. Merely by way of example, in a set of embodiments, a monitoring agent may store representations monitored events (and, in some cases, data associated with such representations) in an event cache, even, in some cases, before events have been analyzed or scored. This can allow the monitoring agent to collect prologue events, which may be related to the event of interest but which occurred prior in time to the event of interest. Hence, embodiments of the invention can provide the ability to capture events that, in the past, would have gone unnoticed.

In another aspect of certain embodiments, the event cache provided by certain embodiments can allow for the collection of events even when the monitored computer lacks connectivity with a monitoring server. Hence, events may be monitored even when the monitored computer is offline, such as in the case of a mobile computer, which may often be used in locations without network connectivity.

One set of embodiments provides systems, including without limitation systems for monitoring and/or collecting events on a monitored computer. In an embodiment, the system comprises a monitoring computer and a monitored computer. (It should be noted that, while the monitored computer may be in communication with the monitoring computer from time to time, some embodiments of the invention are configured to allow monitoring and/or collection of events even when the monitored computer is out of communication with the monitoring computer. In this way, various embodiments can accommodate mobile computing, such as when the monitored computer is a laptop, PDA, etc. and thus may not always have network connectivity. In addition, in some cases, the ability of the system to provide monitoring and/or collection of events even without connectivity with the monitoring computer can help avoid detection of the monitoring/collection by a user of the monitored computer.)

An exemplary monitoring computer may comprises a processor and a set of instructions executable by the processor. The set of instructions can include, variously, instruction to monitor a network for a connection by a monitored computer, computer, ins tractions to receive a set of one or more representations of events occurring on the monitored computer, and/or instructions to analyze any received representations of events. In this way, for example, the monitoring computer can determine whether the events are associated with any improper activities by a user of the monitored computer (and/or another). Such improper activities can include, merely by way of example, accessing inappropriate content on the Internet, transferring confidential information from the monitored computer (e.g., via a network connection, via a USB drive and/or other removable media, etc.), and the like.

An exemplary monitored computer also comprises a processor and a set of instructions executable by the processor. In certain embodiments, the set of instructions may be incorporated within a monitoring agent on the monitored computer. This set of instructions can include, merely by way of example, instructions to monitor a plurality of events, each of which may occur at the monitored computer. In some cases, the set of instructions also includes instructions to store a representation of each of the plurality of events, perhaps in an event cache. One (or more) of the events on the monitored may be identified as requiring collection.

In certain embodiments, the monitored computer may also have instructions to determine a window of interest prior in time to the identified event, such that events falling within the window of interest should be collected. Of the plurality of events, one or more events falling within the window of interest may be identified.

In a particular embodiment, the monitored computer can further comprise instructions to queue the representations of the identified event and the one or more events falling within the window of interest. In an aspect of some embodiments, queuing the events comprises storing the events in an event cache and/or marking for collection one or more events already stored in an event cache. There may be further instructions to establish connectivity with the monitoring computer and/or to transmit the queued representations of events for reception by the monitoring computer.

As noted above, in some cases, the monitored computer may not have connectivity with the monitoring computer at all times. In a set of embodiments, therefore, a variety of the procedures described above may occur while the monitored computer does not have connectivity with the monitoring computer. Merely by way of example, in an aspect of some embodiments, queuing an event can comprise marking an event for later transmission to the monitoring computer.

In another set of embodiments, a system for monitoring events on a monitored computer comprises a monitored computer having a processor and a set of instructions executable by the processor. In a particular embodiment, the set of instructions includes instructions to monitor a plurality of events, each of which may (and/or might) not be occurring at the monitored computer. Additionally, and/or alternatively, there may be an instruction to store a representation of each of the plurality of events, for example, in an event cache.

In an aspect of some embodiments, identifying an event may comprise identifying a set of text associated with the identified event and/or comparing the set of text with at least one keyword. Various procedures for performing this comparison are described in detail in U.S. patent application Ser. No. 11/557,007, already incorporated by reference. An exemplary procedure might comprise receiving at the monitored computer a regular expression that is satisfied by the keyword and a package comprising the at least one keyword and a set of at least one hash value generated from the keyword. The procedure might further comprise evaluating the set of text against the regular expression to determine whether at least a portion of the set of text satisfies the regular expression. Based on an evaluation of the set of text against the regular expression, a text hash might be generated from the at least one portion of the set of text and/or compared the text hash to the at least one hash value. Based, for instance, on a comparison of the text hash with the at least one hash value, the event might be identified as an event requiring monitoring.

In some cases, the set of instructions further comprises instructions to analyze one or more of the plurality of events and/or to identify, for example, based on the analysis of the events, one or more events as requiring collection. In a particular set of embodiments, analyzing an event may comprise performing an analysis of the event against one or more rules, which defined characteristics of events that should be collected. Based on an analysis of the event, one or more scores may be assigned to the event. These score(s), then, sometimes are compared with one or more thresholds. Based on a comparison of the assigned score(s) with the thresholds, a determination can be made whether the event should be collected.

A variety of rules may be used to analyze events. Merely by way of example, one or more of the rules may identify a list of events that are relatively more likely to be collected (if, for example such events are of interest to an entity monitoring the monitored computer). As another example, one or more of the rules may identify a keyword (and/or a set of keywords), such that an event having content that matches one of the keywords is relatively more likely to be collected. Likewise, one or more rules may specify one or more regular expressions, such that an event having content that satisfies one of the one or more regular expressions is relatively more likely be collected. Other rules might define a window of time, such that events occurring within (or, alternatively, outside) the window of time are relatively more likely to be collected.

In some cases, a plurality of scores may be assigned to a given event. In an aspect, the plurality of scores may be assigned by analyzing the event against a plurality of rules, each of which might define characteristics of events that should be collected. In another aspect, a composite score may be calculated from the plurality of scores and/or compared with one or more thresholds. Alternatively and/or additionally, each of the plurality of scores may be compared with one or more thresholds—based on the comparison of the plurality of scores with the one or more thresholds, a determination can be made of whether the event should be collected.

In some cases, an analysis of one event may have an impact on the analysis of another event, and/or more than one event can be analyzed collectively. Merely by way of example, consider a case in which the plurality of events comprises a set of events, including a first event and a second event. Analyzing the events then, might comprise performing an analysis the first event against one or more rules defining characteristics of events that should be collected and performing an analysis of the second event against one or more rules defining characteristics of events that should be collected. Based on the analyses of the first and second events, a score may be assigned to one or more events in the set of events (possibly including the first event and/or the second event). Those score(s) may be compared with one or more thresholds. Based on the comparison, a determination may be made of whether one or more events in the set should be collected.

In this example, one of the events might be a communication between the monitored computer and another computer (perhaps using a first application program), and another event in the set might be a communication involving the monitored computer (perhaps via a second application program). Alternatively, one of the events might be a communication, while another of the events is an event other than a communication (such as a file create event, a file modify event and/or a file delete event, to name but a few examples).

As described in more detail below, certain embodiments of the invention provide the ability to collect prologue events occurring before an event that is identified for collection. Merely by way of example, in some embodiments, a monitored computer comprises instructions to determine that a set of one or more events occurring prior in time to the identified event should be collected. A window of interest (which may be prior in time to the identified event) might be identified, such that events occurring during the window of interest should be collected. One or more events falling within the window of interest may be identified from the plurality of events, and/or a representation of each of these events may be queued for transmission to the monitoring computer. In some cases, such events may be associated with the originally-identified event and/or each other (e.g., by a notation, flag, etc. in an event cache and/or event queue).

In a set of embodiments, the set of instructions may comprise instructions to queue the representation(s) of the identified event(s) for transmission (e.g., to a monitoring computer). Merely by way of example, in some cases, queuing the representation of the identified event comprises storing the representation of the identified event in an event queue and/or an event cache, marking an event already stored in an event cache as requiring transmission, and/or the like. (In some cases, for example, the event queue can be incorporated within the event cache, such that storing a representation of an event in the event queue comprises marking the representation in the event cache, such that marked representations are to be transmitted. In other cases, the event queue may be a separate data store, such that only events designated for transmission to the monitoring computer are stored in that separate data store.)

In some embodiments, then, the representations (and/or at least portions thereof) of identified events may be transmitted for reception by the monitoring computer. As noted above, in some cases, the monitored computer is not in communication with the monitoring computer during the monitoring of the plurality of events; in such cases, queuing the representation of the identified event for transmission to a monitoring computer may comprise marking the representation of the event in the event cache for later transmission to the monitoring computer. Hence, this transmission may occur, for example, when the monitored computer establishes connectivity with the monitoring computer. Alternatively, this transmission may occur immediately in some embodiments.

In a set of embodiments, a representation of an identified event comprises a copy of the event and/or a hash value generated from the event. Hence, in some cases, transmitting at least a portion of a representation of an event may comprise transmitting merely a hash value generated from an event. In a particular embodiment, the monitoring computer may then send a notification to the monitored computer that the monitoring computer does not recognize the hash value as corresponding to any event identified by the monitoring computer, and the monitored computer may have instructions to receive such a notification. The monitored computer then, may also have instructions to transmit the copy of the event to the monitoring computer, perhaps in response to the notification.

In a set of embodiments, storing a representation of each of the plurality of the events may comprise recording at least one of the plurality of events and/or storing the at least one recorded event. Additionally and/or alternatively, storing a representation of an event can comprise generating a hash value from the event and/or searching the event cache for an existing hash value matching the generated hash value. In some cases, if an existing hash value matching the generated hash value is found in the event cache, storing a representation of the event comprises storing the generated hash value (e.g., in the event cache) as the representation of the event. Conversely, if no existing hash value matching the generated hash value is found, storing a representation of the event may comprise storing a copy of the event in the event cache. Optionally, the generated hash may be stored with the copy of the event in the event cache.

In another set of embodiments, storing a representation of an event further comprises creating an identifier associated with the event and/or storing the identifier in the event cache along with the event (and/or, more precisely, a copy of the event). The identifier can comprise any germane information about the event, including without limitation a context of the event, a score assigned to the event, etc. In a particular embodiment, for example, the identifier comprises a timestamp of the event. In another embodiment, the identifier comprises information sufficient to identify the monitored computer from among a plurality of computers. In other embodiments, the identifier can comprise information about an application associated with the event, information about a session associated with the event, information about a collection associated with the event (e.g., information about a collection of events of which the identified event is a member), and/or the like. In some cases, the identifier may comprise information sufficient to establish a chain of evidence regarding the event; in this way, for example, the identifier can allow identification of a time of the event and the monitored computer on which the event occurred. In various embodiments, the identifier can comprise any or all of the above information, as well as any other appropriate information.

Another set of embodiments comprises methods, including without limitation methods implemented by the systems described above. An exemplary method of monitoring events on a monitored computer comprises monitoring (perhaps with a software agent on the monitored computer) a plurality of events occurring on the monitored computer. For each of the monitored events, the method might further comprise generating a hash value corresponding to the monitored event, and/or searching an event cache for an existing hash value matching the generated hash value. If an existing cached event has a hash value matching the generated hash value is found in the event cache, the generated hash value may be stored as a representation of the monitored event. Conversely, if no existing hash value is found in the event cache, a copy of the monitored event, perhaps along with the generated hash value, may be stored in the cache as a representation of the event.

The method further comprises, in some embodiments, identifying one of the plurality of events are requiring collection and/or queuing the representation of the identified event(s) for transmission to a monitoring server. In a set of embodiments, the software agent can be configured such that actions performed by the software agent are not detectible by a user of the monitored computer.

Yet another set of embodiments comprises computer software programs, including without limitation software programs that perform the methods described above and/or are implemented in the systems described above. An exemplary computer program, for instance, may comprise instructions to monitor a plurality of events occurring on a computer (for example, the computer on which the software program is installed).

The program might further comprise instructions to store a representation of each of the plurality of events (e.g., in an event cache at the computer) and/or instructions to analyze one or more of the plurality of events to determine whether any of the plurality of events requires collection. Further instructions may be executable to identify one (or more) of the plurality of events on the computer as requiring collection, perhaps based on an analysis of each of the plurality of events. In an aspect, the program might further comprise instructions to determine that a set of one or more events occurring prior in time to the identified event should be collected and/or instructions to specify a window of interest prior in time to the identified event, such that events occurring during the window of interest should be collected. One or more events one or more events falling within the window of interest may be identified, and/or representations of such events may be queued, for transmission to a second computer.

A system in accordance with one set of embodiments comprises a monitoring agent that resides on a monitored computer. Candidate events for monitoring are analyzed for relevance. In an aspect, the monitoring agent is configured to monitor a wide variety of activities in which a computer user might engage, including events and activities local to the client computer, as well as events and activities that are conducted over a LAN or using an intranet or internet. In another aspect, the monitoring agent is capable of intercepting client computer events prior to the encryption of their content be installed upon each monitored client computer.

Whenever an event is detected that qualifies under some set of rules as worthy of further inspection, the monitoring agent collects the detected event, as well as any associated information for further analysis and evaluation. In many cases not only is the qualifying event of interest, but so also is the behavior that forms the prologue to the current event of interest. In some cases, therefore, the agent is capable of capturing these prologue events together with the epilogue events that follow, to provide a full context for the event of interest.

In other cases, the monitored user may undertake questionable behavior when not currently connected to a network, such as copying a prohibited file onto a USB removable storage device. Hence, in an aspect of the invention, the monitoring agent saves all qualifying events (in some cases, together with the prologue and epilogue events, as well as any additional contextual information), into a cache located on the monitored client computer, so that the qualifying events and prologue and epilogue events can be transmitted to the collection server when one becomes available. U.S. patent Ser. No. 11/557,025, already incorporated by reference, describes a number of exemplary event caches that can be used in accordance with embodiments of the present invention.

In some embodiments, the monitoring agent assigns a unique hash to all collected events that have significant content, such as graphical elements and other fixed page content. This feature can be used to minimize the size of the event cache and/or the amount of additional network traffic created by the collection of monitored client events by the collection server. Merely by way of example, in some cases, whenever a content-rich event is qualified for collection by the monitoring agent, the client initially transmits to the collection server the hash of the event content; if the collection server has already received and stored a copy of the same event content, it is not necessary to collect the same information again. Accordingly, the collection server can be configured to search its own data store (which might, but need not, comprise a storage structure similar to the cache on the monitored computer) for a hash matching the hash of the collected event.

If a matching hash is found, the collection server will make, in some cases, a reference to the prior-collected instance of the same event content (e.g., storing another copy of the hash as a representation of the collected event), thereby minimizing network traffic and collection server storage requirements. Otherwise the collection server may retrieve the contents of the event item, either from the monitoring agent and/or directly from the original source of the item content (if, for example, the item content comprises a web page and/or similar resource available from a source other than the monitored computer.

Alternatively and/or in addition, the collection server might be configured to transmit (on one or more occasions, such as on demand, periodically, etc.) to the monitoring agent a copy of all hash values for events stored by the collection server. Those hash values may be stored in the event cache on the monitored computer and thereafter compared to hashes generated from collected events. Hence, the comparison of a generated hash to a set of stored hashes may occur at the monitoring server, monitored computer, or both.

It should be noted that, for ease of description, the term "event" is sometimes used herein with respect to describing how a representation of an event is collected and/or replayed. One skilled in the art will appreciate, however, based on this disclosure, that an event generally occurs a single time at the monitored computer, and the event may be analyzed at that time to determine whether it is relevant—that is, whether it should be collected. Thereafter, a representation of the event generally is collected, analyzed, etc., not the event itself. Hence, unless the context dictates otherwise, references herein to an "event" should be taken to include both the event itself and a representation of that event.

FIG. 1 illustrates an exemplary system 100 for monitoring a computer. The system 100 comprises a client computer 105 (also referred to herein as a "monitored computer"), which comprises an operating system 110. The operating system 110 can be virtually any operating system, including without limitation any of the various varieties of Microsoft Windows™, Apple Macintosh OS™, UNIX™ (and/or any derivative operating systems, such as BSD, Linux, etc.), and/or the like. The client 105 also comprises an event monitoring agent 115; the event monitoring agent is capable of monitoring, analyzing and/or collecting events in accordance with methods of the invention, as described in further detail below. A monitoring agent may comprise a plurality of functional components, including without limitation those described in detail in U.S. patent application Ser. No. 11/557,025, already incorporated by reference. (It should be noted, however, that the structural organization of the monitoring agent is discretionary and can vary according to different embodiments of the invention.)

In a set of embodiments, the monitoring agent may store in an event cache 120, as described in more detail below, the content and context of some or all events that are generated by a user (and/or by the operating system 110, an application program, etc.) when utilizing the monitored client computer 105. At certain times (but possibly not always), the client 105 may be in communication with a monitoring server computer 125, which can be in communication with the event cache 120 and/or the monitoring agent 115, although such communications may not be apparent to the user of the client 105, as described elsewhere herein. The monitoring server computer 125 may comprise any appropriate operating system, including without limitation those described above, as well as a monitoring server application, which interacts with the monitoring agent 115 and/or event cache 120. The monitoring server may provide other services as well, including without limitation an event replay service, as described more fully in U.S. patent application Ser. No. 11/556,968, already incorporated herein by reference. In a set of embodiments, the monitoring server 125 communicates with the client 105 using an IP-based connection (such as via the Internet 135, etc.)

The client 105 may also be in communication with a variety of devices, including without limitation locally-connected devices 130 (including, merely by way of example, digital sources 130*a* such as cameras, etc., thumb drives 130*b* and other transient storage devices, and external hard drives 130*c*), network connections to the Internet 135 (and/or other online services, WANs and/or the like), LAN resources 140 (such as network servers 140*a*, printers 140*b* and/or network storage 140*c*, to name but a few examples). In addition, the client 105 may comprise (and/or be in communication with) a variety of local devices (both physical and virtual) 145, such as internal storage 145*a*, display devices 145*b*, input devices (such as a keyboard 145*d* and/or mouse 145*e*, to name a few examples), an a clipboard 145f (which can be used to hold data cut and/or copied from an application or the operating system 110).

Figure 2:
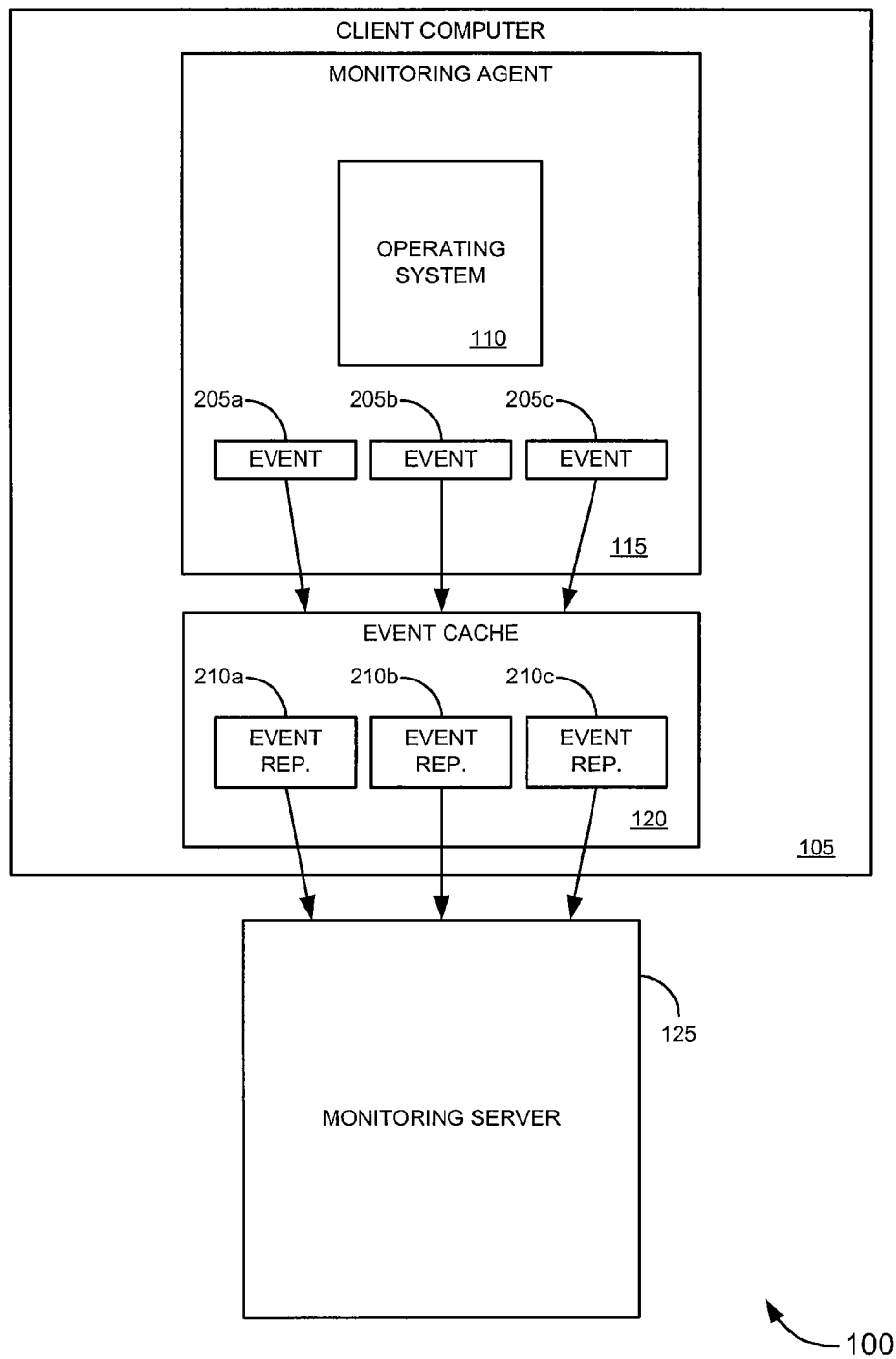
FIG. 2 is a functional diagram illustrating how the system of FIG. 1 can be used to capture events with an event cache, in accordance with various embodiments of the invention.

As illustrated by FIG. 2, in some embodiments, the monitoring agent 115 is configured to capture selected events 205 occurring at the client 105. Representations 210 of captured events 205 then may be stored at the event cache 120. (As described below, in some cases, a representation 210a of a particular event 205a may comprise a hash computed from a set of rich data associated with the event.) The stored representations 210 of the events 205 then can be transferred to the monitoring server 125 when connectivity is established between the monitoring server 125 and the client 105 (and/or at another appropriate time).

Figure 3:
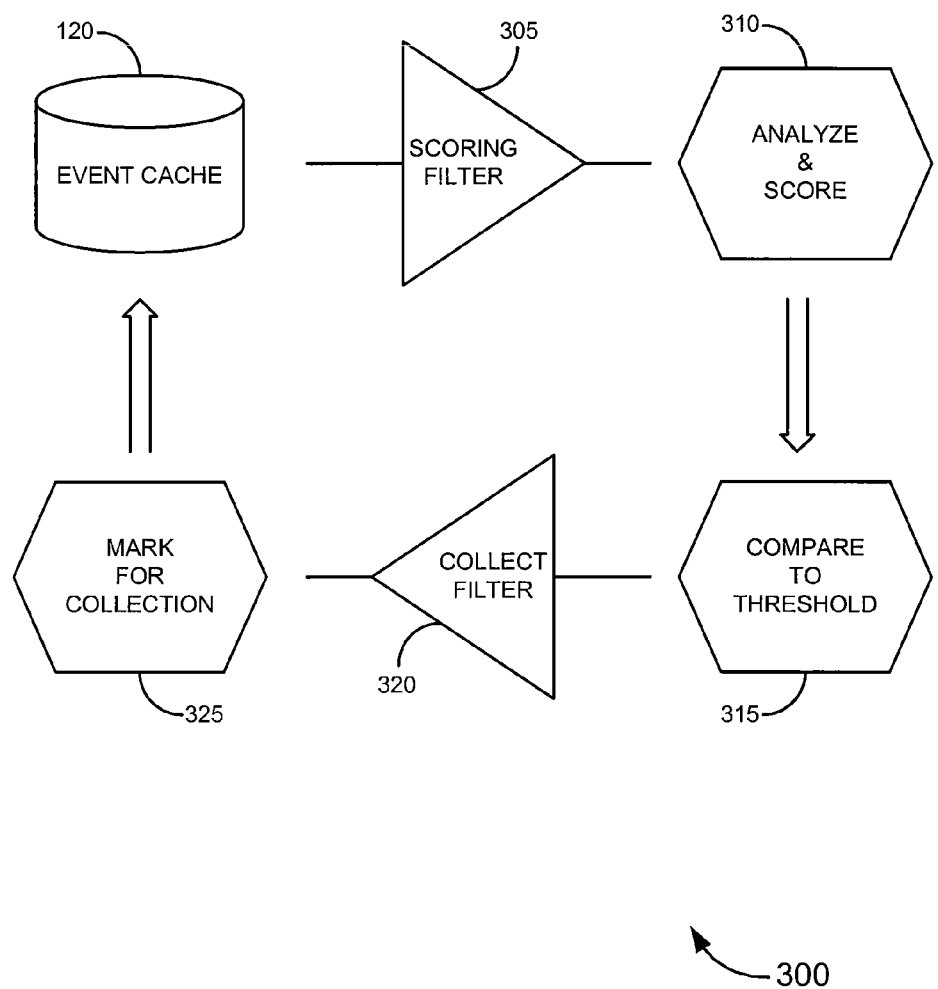
FIG. 3 is a flow diagram illustrating a process for analyzing and/or scoring events, in accordance with various embodiments of the invention.

FIG. 3 is a schematic diagram illustrating components of a process for analyzing and scoring monitored events. In some embodiments, some or all monitored events are captured by the event monitoring agent and stored in the event cache 120. In particular embodiments, the events may be processed and evaluated on the client, for example to insure that only events of interest (that is, events that include information deemed to be of value to an entity monitoring the client computer). In some embodiments, events may be stored in the cache 120 prior to analysis and/or scoring, and/or events in the cache 120 may be marked for transmission to a monitoring server 125 based on an analysis and/or an assigned score. In other embodiments, events are analyzed/scored before being saved in the cache 120, such that only events meeting certain criteria are stored in the cache. In either case, the procedure 300 illustrated by FIG. 3 can be used.

In an aspect, all events are passed through an event scoring filter 305, analyzed and scored 310 by a configurable scoring mechanism that creates a numeric score for each event. The event scoring filter 305 is used to determine which parts or content of the events captured in the event side cache 120 are subject to the analysis and scoring mechanism 310 (and/or which parts/content of events should be analyzed and/or scored to determine whether the events should even be placed in the cache). Merely by way of example, the event scoring filter 305 might indicate that text associated with an event should be analyzed/scored, but that any mouse clicks should not be analyzed (or vice-versa). Alternatively and/or additionally, the event scoring filter 305 might indicate that IP addresses of sites visited by the client computer should not be scored/analyzed but that the content of web pages at such sites should be analyzed/scored (or vice-versa). As noted below, the scoring filter may be part of a configuration package that can be updated from the monitoring server 125 (and/or another computer responsible for configuring the agent 115).

The analysis and/or scoring of events may be performed by a scoring engine, which can also be configurable by a monitoring server 125 (and/or another computer). In an aspect of the invention, the scoring engine is configured to apply a set of one or more rules to an event, in order to determine whether the event merits collection. In a set of embodiments, the scoring engine can be configured to analyze an event according to any number of applicable rules, and based on the rules, assign one or more scores to the event. Merely by way of example, if an event comprises uploading a file to a web site, the scoring engine might assign a first score to the event based on the fact that a file was uploaded, a second score based on the URL (and/or IP address) of the site to which the file was uploaded, and a third score based on the content (e.g., text) of the file.

In some cases, the individual scores will be combined to create a composite score, which will then be compared to a threshold (as described in more detail below). In other cases, each of the individual scores may be compared to one or more thresholds. Depending on the configuration, different requirements may apply in this situation. Merely by way of example, if multiple scores are assigned to an event, the monitoring agent might require all of the scores to exceed their respective thresholds to trigger collection; alternatively, the monitoring agent might merely require that a single one of the assigned scores for an event exceeds a threshold to trigger collection. A variety of other requirements are possible as well.

Embodiments of the invention can provide relatively great flexibility through the use of configurable rules for analysis and/or scoring. In a set of embodiments, for example, rules can be downloaded to the agent from a monitoring server (and/or another control computer). In this way, the entity responsible for monitoring the client can remotely configure the agent to prioritize certain types of events, depending on the concerns that motivate the monitoring of the client.

A variety of different rules may be used. Merely by way of example, analysis/scoring rules can include, without limitation, rules related to the use of an encrypted protocol, the use of encrypted content, the transmission of an electronic mail message, the receipt of an electronic mail message, attachment of a file to an electronic mail message, attachment of an encrypted file to an electronic mail message, loading an HTML page in a web browser, unloading an HTML page in a web browser, a web browser request for a URL, loading of an image in a web browser, loading of a script in a web browser, a file download, an HTML form reset, an HTML form submit, an HTML form text field input, an HTML form personal information file input, an HTML radio button selected, an HTML check box selected, an HTML check box unselected, a selection from an HTML selection list, a transmission of an instant messenger message, a receipt of an instant messenger message, a creation of a file by an office application, a read of a file by an office application, a write to a file by an office application, a creation of a print job, a copy of data to a clipboard, an entry of one or more keystrokes by a user, an input from a mouse attached to the monitored computer, a movement of a cursor over an HTML elements on a display, a drive mount operation, a drive dismount operation, an unsuccessful attempt to mount a drive, a file create operation, a file copy operation, a file move operation, a file delete operation, a file read operation, a file rename operation, a file write operation, and/or data satisfying one or more configured regular expressions, to name several examples.

It should be noted that the examples above are generalized and may form the basis of more particular rules, based on various circumstances. Merely by way of example, while loading an HTML page might be the subject of a generalized rule, a more specific rule might concern the URL associated with the page, the content in the page, etc. In some cases, keywords and/or pattern matching algorithms, including without limitation those described in U.S. patent application Ser. Nos. 11/557,007 and 11/556,984, already incorporated by reference, may be used by certain rules. One skilled in the art will appreciate, based on the disclosure herein, that the types of rules that can be used virtually unlimited and that the particular rules used often will vary according to implementation-specific factors.

Once an event is analyzed and/or scored, the analysis/score of the event may be compared to a threshold 315 to determine whether the event should be stored in the cache 120 and/or collected by the monitoring server 125. As noted above, a plurality of scores may be compared with a plurality of thresholds, and/or a composite score may be compared with a composite threshold. Once again, the thresholds may be configurable, based perhaps on configuration information downloaded to the agent 110 from a monitoring server 125 (or another computer). The thresholds may be based, for example, on the priorities of the monitoring entity. Merely by way of example, if transmission of financial data is of particular concern, the thresholds for file uploads may be relatively more stringent. Conversely, if the concern is that a user of the client 105 is visiting inappropriate web sites, the thresholds for URLs and/or HTML page content may be relatively more stringent. Together with the configurable analysis/scoring algorithms, the configurable thresholds provide considerable flexibility in determining the nature of the monitoring process.

If it is determined that the captured event is eligible for collection, a collection filter 320 is used to determine which elements of a qualifying captured event are eligible for collection. Merely by way of example, if a captured event comprises the transmission of an email message, the monitoring entity might be interested in the content and/or recipients of the message, but might be less interested in the actual keystrokes that produced the message. Thus, in some embodiments it is possible to score an event using one element of the event and collect some different parts of the event, but not necessarily the element that was used to score and qualify the event for collection. The collection filter 320, like other components may be configurable by the monitoring server (and/or another computer).

The events and portions of the events that qualify for collection are marked by a marking component 325. In some cases, marking an event (and/or portion of an event) may comprise setting a flag in the cache 120 indicating that the event is to be collected. Alternatively, marking the event (and/or portion thereof) for collection sometimes can comprise merely storing the event in the cache 120.

In many cases, if an event is of sufficient interest to be collected, other, related events may be appropriate for collection as well. Merely by way of example, if a file upload event is selected for collection, a series of events leading up to that event may be of interest as well, because, for example, they might shed light on actions taken with respect to the file before uploading. For instance, if an encrypted file is uploaded to a web page, an earlier event might comprise the encryption of the file itself.

Figure 4:
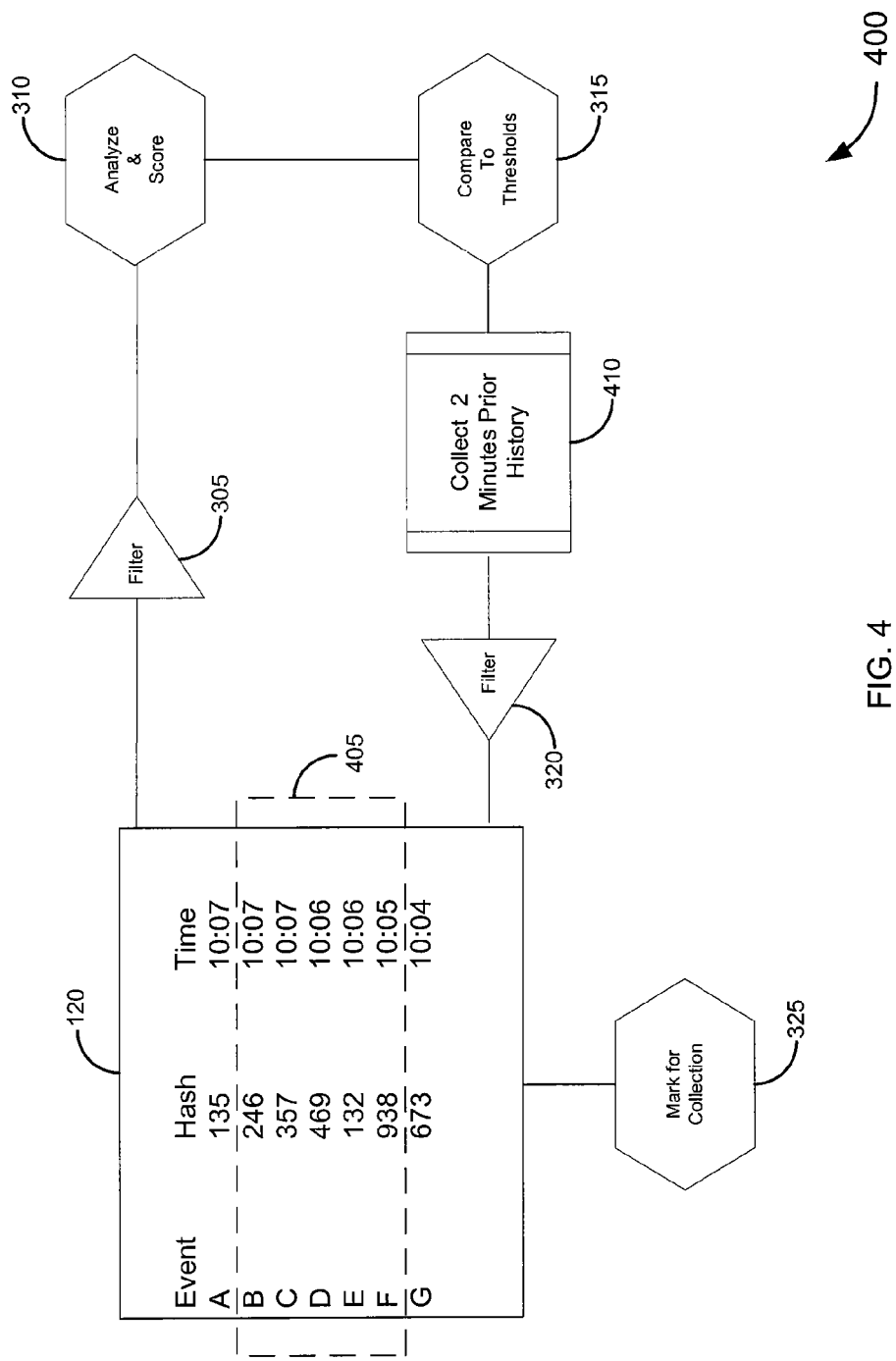
FIG. 4 is a flow diagram illustrating how one or more prologue events can be collected, in according with various embodiments of the invention.

FIG. 4, then, illustrates a process 400 for identifying and/or collecting events related to a particular event of interest (related events occurring prior in time to the event of interest are referred to herein as "prologue" events). Merely by way of example, in FIG. 4, Event A has been denoted as an event of interest, and events B-G (collectively referenced using numeral 405) can be considered prologue events. As noted above, in some embodiments, every event may be stored in the cache 120; this feature provides one (although not the only) way in which prologue events may be collected.

According to the process 400 of FIG. 4, once an event has been qualified as eligible for collection (e.g., using the scoring filter 305, analysis/scoring engine 310 and/or thresholds 315 described above), the agent 105 makes a determination 410 of how far back in time to collect prologue events. In this example, the agent is configured, with respect to the event A of interest here, to collect all prologue events B-G occurring within two minutes prior to the event A of interest.

It should be noted that the window for prologue events may be determined based on the event type for the event of interest—for some events, it might be appropriate to collect prologue events relatively further back in time, while for other events of interest, only relatively recent events of interest need be collected. These "windows" can be set by configuration information downloaded to the agent from a monitoring server 125, as with other configuration parameters. It should also be noted that events occurring after the event of interest (which can be considered "epilogue events" under the nomenclature used herein) may be collected as well, although the "lookback" feature described here may not be necessary to collect such epilogue events, since such events by definition will occur after the event of interest and can be marked for collection as they occur.

The event A of interest and the appropriate prologue events B-F (as specified by the prologue event collection configuration, which in the illustrated example, configures the collection filter to collect prologue events within a two minute window prior to the event of interest) are processed by the collection filter 320 as described above and are marked for collection 325, also as noted above. As already mentioned, epilogue events, since they occur following the qualifying event, will be marked for collection for the time duration specified in the epilogue event collection configuration. If another qualifying event occurs before the expiration of the epilogue event collection window has expired, then the epilogue event collection window may be recalculated from the time of the latest qualifying event.

In some cases, an event can be relatively discrete, such as a single mouse click, etc. In other cases, however, an event may involve relatively substantial content, such as a web page, a file, and/or the like. Collecting a large number of such "content-rich" events can generate substantial overhead, since the content of each may need to be cached and/or transmitted to the collection server 120. Accordingly, certain embodiments of the invention can provide a facility to reduce such overhead.

To list but a few examples, content-rich events can include, any of the following: an HTML page, an image, a stylesheet, a script, an uploaded file, a downloaded file, an instant messaging buddy list, an instant messaging conversation, an email body, an email attachment, a clipboard copy contents, a clipboard bitmap, information about a print job, and information about a file access operation.

Figure 5A:
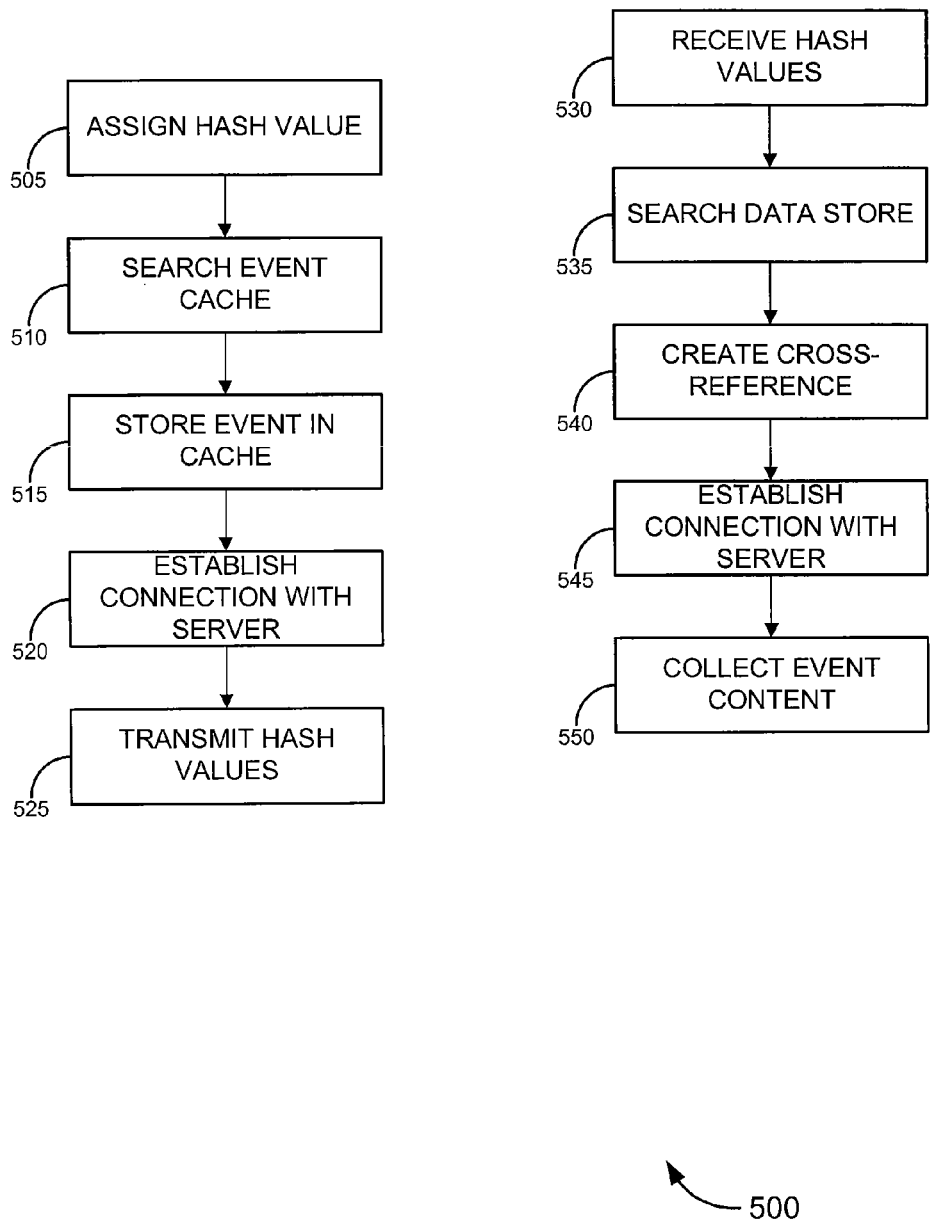
FIG. 5A is a flow diagram illustrating a process of hashing events in an event cache, in accordance with various embodiments of the invention.
Figure 5B:
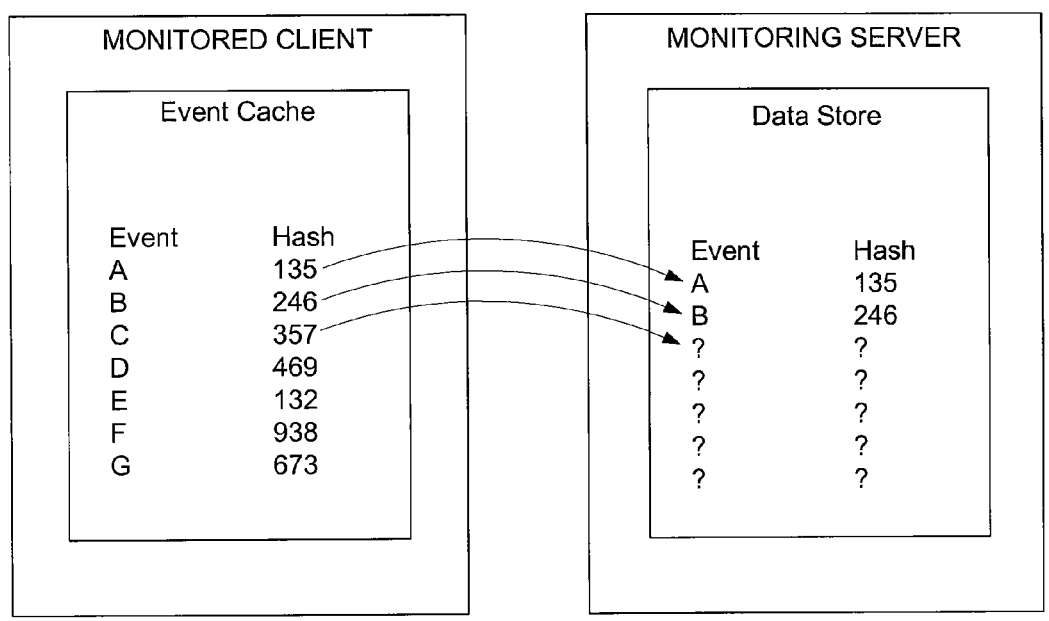
FIG. 5B is a conceptual drawing of the relation between events in an event cache on a monitored computer and events in an event store on a monitoring server, in accordance with various embodiments of the invention.

Merely by way of example, FIG. 5A illustrates a process 500 for efficiently collecting large (e.g., content-rich) events from a client-side cache 120 to a collection server 125. This process is illustrated schematically by FIG. 5B. In an aspect, some or all content-rich events in the cache 120 are assigned a unique hash value (block 505) that is computed using the contents of the event. Any of several known hashing algorithms may be used to compute the hash, including without limitation a checksum and/or the SHA and MD5 algorithms familiar to those skilled in the art.

Next, the monitoring agent searches the event cache on the client (block 510) to determine whether the client-side cache already contains the hash value generated from the event. If the hash is found, the generated hash value may be stored again (perhaps with an identifier, etc.) as a representation of the current event. If not, then the event content (which can include and/or be incorporated within a copy of the event) is stored in the client-side cache as a representation of the event, along with the generated hash value and/or any desired identifiers. In either case, a representation of the event is stored (block 515) according to the present embodiment; the nature of the representation might depend, however, on whether the hash value already exists in the cache.

When content-rich events are marked for collection and the client agent establishes connection with a monitoring server (also referred to herein as a "collection server") (block 520), the monitoring transmits the event hash values to the collection server (block 525). The collection server receives the hash values (block 530) and searches its own data store for each of the transmitted hash values (block 535).

For a particular hash value, if the collection server has previously collected the same event content then the event reference hash value is re-used by the server and a hash cross-reference value, which references the current collected event to the previously collected event item content, is created in the server's data store (block 540). In this manner only a single instance ever needs to collected for repetitively referenced event content (although of course multiple instances could be collected if desired).

Where no prior instance of the content referenced by the hash value has been collected (that is, if the server's data store does not contain the hash value), then the collection server will collect the event content and/or the associated hash value (block 550) (which can include a copy of the event, associated identifiers, and/or other data, such as web pages, associated with the event), either from the client-side cache or directly from the original content source on the internet, and store it in the data store on the collection server.

In some cases, events without significant content, or which are inherently dynamic, such as key strokes or mouse movement events, may not be subject to the hashing mechanism; they are sent up to the collection server as required.

Once the events of interest (and any associated events, such as prologue events) have been successfully transmitted from the client agent to the collection server, the events in the client-side cache become eligible for being purged from the cache when more space is required to collect future events.

Figure 6:
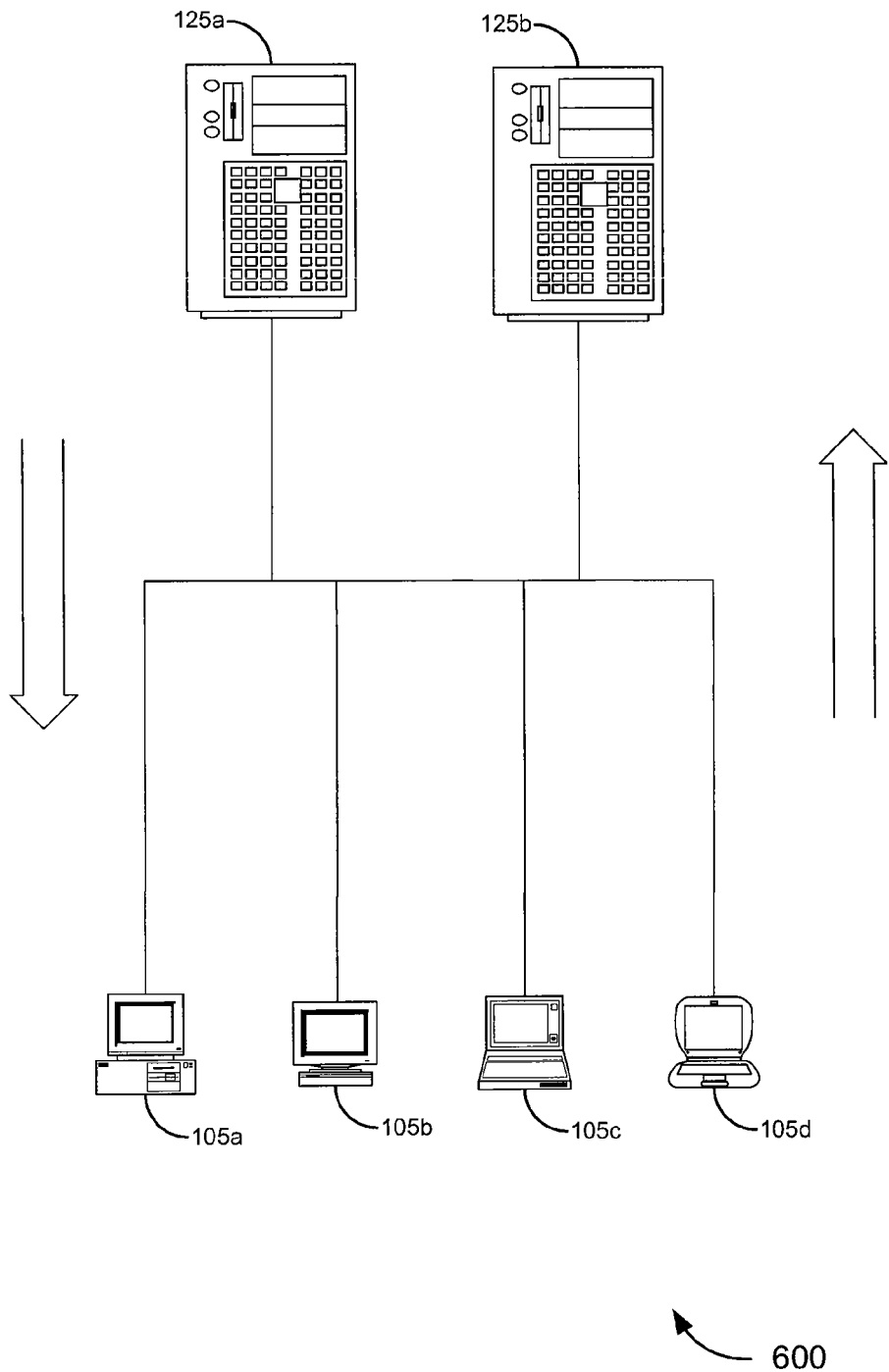
FIG. 6 is a generalized schematic diagram illustrating a plurality of monitoring servers in communication with a plurality of client computers, in accordance with various embodiments of the invention.

In accordance with some embodiments of the invention, one or more monitoring servers may interact in a variety of ways with one or more monitored clients. Merely by way of example, FIG. 6 illustrates an exemplary relationship between a plurality of monitoring servers 125a, 125b and one or more client computers 105a-d (and/or, more precisely, monitoring agents on each of those client computers).

In some embodiments, the monitoring server 125 is responsible for notifying one or more agents when there is a change in agent configuration that needs to be sent to the clients 105. Configuration information can include, without limitation one or more of the following: a scoring configuration, which provides to the agent the rules that the agent uses to analyze and score the content of the events; a scoring filter, which provides to the agent the event elements to be used for analyzing and scoring the events; a triggering configuration, which provides to the agent the thresholds and conditions associated with one or more scoring configuration rules that will determine whether an event is to be collected; a collection filter, which provides to the agent those event elements that will be collected when a triggering condition is satisfied; and/or a collection IP list, which provides a list of one or more collection server IP addresses that the agent will attempt to contact when the agent has accumulated events that must be sent to a collection server.

Depending on the embodiment, the triggering configuration, in addition to specifying the threshold required to cause an event to be collected, can also specify a prologue collection period and an epilogue collection period that are used by the agent as follows. When a triggering threshold is satisfied, making an event eligible to be collected, the agent looks back through the client-side cache and also marks for collection any events that have occurred within the prologue collection period, enabling collection and observation of the prologue context events leading up to the trigger being satisfied. Likewise, collection by the client agent will continue for the period of time specified in the epilogue collection period, enabling collection and observation of the context events that follow the event that satisfied the trigger.

In an aspect of some embodiments, when events are collected and transmitted from the client agent to a monitoring server 125, they are marked with identification to show which agent and which user are associated with the events, together with a timestamp, the event item hash ids and any event item contents. Each transmission package may also be terminated with a digital signature computed on the contents of the transmission package, ensuring a chain of custody audit trail.

Often, when a client agent 115 contacts a monitoring server 125 to transmit collected events, the monitoring server 125 will determine if there is any updated configuration information available that is relevant to the client and/or users thereof. If available, the updated configuration information is transmitted to the client agent 115, which may immediately start using the updated configuration information.

If a client agent is unable to establish contact with a collection server at the time that events are marked for collection in the client-side cache, the events will remain in the cache, marked for collection and will be transmitted to the collection server at the next available opportunity. This mechanism permits the monitoring of user activity on monitored client systems when collectable events are detected even though the monitored client system is not currently connected to a network.

Figure 7:
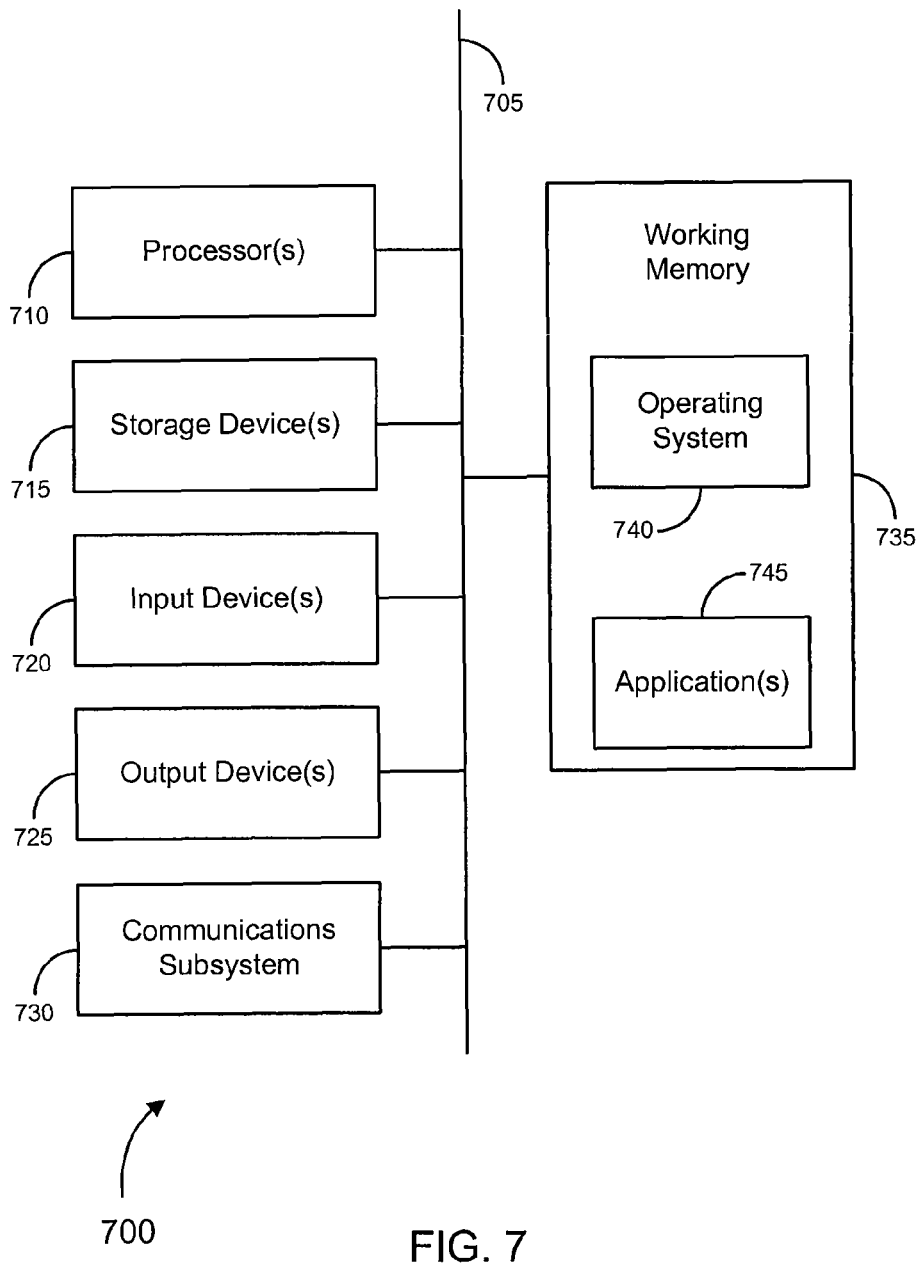
FIG. 7 a generalized schematic illustration of a computer system that may be used in accordance with various embodiments of the invention.

FIG. 7 provides a generalized schematic illustration of one embodiment of a computer system 700 that can perform the methods of the invention and/or the functions of computer, such as the monitoring servers and clients described above. FIG. 7 is meant only to provide a generalized illustration of various components, any of which may be utilized as appropriate. The computer system 700 can include hardware components that can be coupled electrically via a bus 705, including one or more processors 710; one or more storage devices 715, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 705 can be one or more input devices 720, which can include without limitation a mouse, a keyboard and/or the like; one or more output devices 725, which can include without limitation a display device, a printer and/or the like; and a communications subsystem 730; which can include without limitation a modem, a network card (wireless or wired), an infra-red communication device, and/or the like).

The computer system 700 also can comprise software elements, shown as being currently located within a working memory 735, including an operating system 740 and/or other code 745, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for monitoring events on a monitored computer, the system comprising:
   a monitoring computer comprising a first processor and a first set of instructions, the first set of instructions operable, when executed by the first processor, to:
      (a) monitor a network for a connection by a monitored computer:
      (b) receive a set of one or more representations of events occurring on the monitored computer; and
      (c) analyze the received representations of events to determine whether the events are associated with improper activities by a user of the monitored computer; and
   a monitored computer comprising a second processor and a second set of instructions, the second set of instructions comprising instructions executable by the second processor, the second set of instructions comprising:
      (aa) monitor a plurality of events, each of the plurality of events occurring at the monitored computer;
      (bb) store a representation of each of the plurality of events in an event cache;
      (cc) identify one of the plurality of events on the monitored computer as an event of interest, the identifying comprising:
         analyzing each of the plurality of events against one or more rules defining characteristics of events that should be collected;
         assigning at least one score to the plurality of events based on the analysis of the plurality of events;
         comparing the at least one score assigned to the plurality of events with one or more thresholds; and
         identifying one of the plurality of events on the monitored computer as the event of interest based on the comparison;
      (dd) determine a window of interest prior in time to the event of interest, such that events falling within the window of interest should be collected;
      (ee) identify, from the plurality of events, one or more events falling within the window of interest;
      (ff) queue, for transmission to the monitoring computer, the representations of the event of interest and the one or more events falling within the window of interest;
      (gg) establish connectivity with the monitoring computer; and
      (hh) transmit the queued representations of events for reception by the monitoring computer;
   wherein steps aa)-ff) occur while the monitored computer does not have connectivity with the monitoring computer, such that the queuing the representations of the event of interest and the one or more events falling within the window of interest comprises:
   marking, in the event cache, each of the representations of the event of interest and the one or more events falling within the window of interest for later transmission to the monitoring computer.

2. A system as recited by claim 1, wherein the event of interest is selected from the group of events consisting of:
   a use of an encrypted protocol,
   a use of encrypted content,
   a transmission of an electronic mail message,
   a receipt of an electronic mail message,
   an attachment of a file to an electronic mail message,
   an attachment of an encrypted file to an electronic mail message,
   a load of an HTML page in a web browser,
   an unload of an HTML page in a web browser,
   a web browser request for a URL,
   a load of an image in a web browser,
   a load of a script in a web browser,
   a file download,
   an HTML form reset,
   an HTML form submit,
   an HTML form text field input,
   an HTML form personal information file input,
   an HTML radio button selected,
   an HTML check box selected,
   an HTML check box unselected,
   a selection from an HTML selection list,
   a transmission of an instant messenger massage,
   a receipt of an instant messenger message,
   a creation of a file by an office application,
   a read of a file by an office application,
   a write to a file by an office application,
   a creation of a print job,
   a copy of data to a clipboard,
   an entry of one or more keystrokes by a user,
   an input from a mouse attached to the monitored computer,
   a movement of a cursor over an HTML elements on a display,
   a drive mount operation,
   a drive dismount operation,
   an unsuccessful attempt to mount a drive,
   a file create operation,
   a file copy operation,
   a file move operation,
   a file delete operation,
   a file read operation,
   a file rename operation,
   a file write operation, and
   data satisfying one or more configured regular expressions.

3. The system of claim 1, wherein assigning at least one score to the plurality of events based on the analysis of the plurality of events comprises:
   determining content of the plurality of events that should be scored; and
   creating a numeric score for the content that is determined should be scored.

4. A system for monitoring events on a monitored computer, the system comprising:
   a monitored computer comprising a processor and a set of instructions executable by the processor, the set of instructions operable, when executed by the processor, to:
      monitor a plurality of events, each of the plurality of events occurring at the monitored computer;
      for each of the plurality of events:
         generate an identifier corresponding to the event;
         search an event cache for an existing identifier matching the generated identifier;
         store a copy of the event as a representation of the event if an existing identifier matching the generated identifier is not found in the search of the event cache; and
         store the generated identifier as the representation of the event if an existing identifier matching the generated identifier for the event is found in the search of the event cache;
      analyze each of the plurality of events against one or more rules defining characteristics of events that should be collected and, based on the analysis of the plurality of events, assign at least one score to the plurality of events;
      compare the at least one score assigned to the plurality of events with one or more thresholds, and, based on the comparison, identify one of the plurality of events on the monitored computer as an event of interest;
      queue the representation of the event of interest for transmission to a monitoring computer;
      determine that a set of one or more events occurring prior in time to the event of interest should be collected;
      determine a window of interest prior in time to the event of interest, such that events occurring during the window of interest should be collected;
      identify, from the plurality of events, one or more events falling within the window of interest; and
      queue the representation of each of the one or more events falling within the window of interest for transmission to a monitoring computer.

5. A system as recited by claim 4, wherein queuing the representation of the event of interest for transmission comprises storing the representation of the event of interest in an event queue.

6. A system as recited by claim 4, wherein the set of instructions is further operable, when executed by the processor, to transmit at least a portion of the representation of the identified event for reception by the monitoring computer.

7. A system as recited by claim 6, wherein the representation of the event of interest comprises a copy of the event of interest and a hash value generated from the event of interest.

8. A system as recited by claim 7, wherein transmitting at least a portion of the representation of the event of interest comprises transmitting only the hash value generated from the event.

9. A system as recited by claim 8, wherein the set of instructions is further operable, when executed by the processor, to:
   receive from the monitoring computer a notification that the monitoring computer does not recognize the hash value as corresponding to any event identified by the monitoring computer; and
   transmit the copy of the event to the monitoring computer, in response to the notification.

10. A system as recited by claim 6, wherein the monitored computer is not in communication with the monitoring computer during the monitoring of the plurality of events, and wherein queuing the representation of the event of interest for transmission to a monitoring computer comprises marking the representation of the event in the event cache for later transmission to the monitoring computer.

11. A system as recited by claim 4, wherein storing a representation of each of the plurality of events comprises:
   recording at least one of the plurality of events; and
   storing the at least one recorded event.

12. A system as recited by claim 4, wherein the identifier generated for each of the plurality of events comprises a hash value generated for each of the plurality of events.

13. A system as recited by claim 4, the set of instructions further operable to:
   for each of the plurality of events, store the copy of the event and the generated identifier as the representation of the event if an existing identifier matching the generated identifier is not found in the search of the event cache.

14. A system as recited by claim 4, wherein the identifier comprises a timestamp.

15. A system as recited by claim 4, wherein the identifier comprises information sufficient to identify the monitored computer from among a plurality of computers.

16. A system as recited by claim 4, wherein the identifier comprises information about an application associated with the event.

17. A system as recited by claim 4, wherein the identifier comprises information about a session associated with the event.

18. A system as recited by claim 4, wherein the identifier comprises information about an event collection associated with the event.

19. A system as recited by claim 4, wherein the identifier comprises information sufficient to establish a chain of evidence regarding the event, such that the identifier allows identification of a time of the event and the monitored computer on which the event occurred.

20. A system as recited by claim 4, wherein the one or more rules comprises one or more rules identifying a list of events that are relatively more likely be collected.

21. A system as recited by claim 4, wherein the one or more rules comprises one or more rules identifying a set of keywords, such that an event having content that matches one of the set of keywords is relatively more likely be collected.

22. A system as recited by claim 4, wherein the one or more rules comprises one or more rules specifying one or more regular expressions, such that an event having content that satisfies one of the one or more regular expressions is relatively more likely be collected.

23. A system as recited by claim 4, wherein the one or more rules defines a window of time, such that events occurring within the window of time is relatively more likely to be collected or events occurring outside the window of time is relatively more likely be collected.

24. A system as recited by claim 4, wherein the at least one score is a plurality of scores, and wherein the plurality of scores are assigned by analyzing the event against a plurality of rules defining characteristics of events that should be collected.

25. A system as recited by claim 24, wherein comparing the at least one score with one or more thresholds comprises:
   calculating a composite score from the plurality of scores; and
   comparing the composite score with the one or more thresholds.

26. A system as recited by claim 24, wherein comparing the at least one score with one or more thresholds comprises comparing each of the plurality of scores with one or more thresholds, and wherein determining whether the event should be collected comprises determining, based on the comparison of the plurality of scores with the one or more thresholds, whether the event should be collected.

27. A system as recited by claim 4, wherein the plurality of events comprises a set of events comprising a first event and a second event, and wherein analyzing each of the plurality of events comprises:
   performing an analysis the first event against one or more rules defining characteristics of events that should be collected;
   performing an analysis of the second event against one or more rules defining characteristics of events that should be collected;
   based on the analysis of the first event and the second event, assigning at least one score to one or more of the events in the set of events;
   comparing the at least one score with one or more thresholds; and
   based on a comparison of the at least one assigned score with the one or more thresholds, determining whether one or more of the events in the set of events should be collected.

28. A system as recited by claim 27, wherein one of the events in the set of events is a communication between the monitored computer and another computer via a first application program, and wherein another of the events in the set of events is a communication involving the monitored computer via a second application program.

29. A system as recited by claim 27, wherein one of the events in the set of events is a communication between the monitored computer and another computer, and wherein another of the events in the set of events in an event other than a communication between the monitored computer and another computer.

30. A system as recited by claim 4, the set of instructions further comprises:
   instructions to associate the one or more events with the event of interest.

31. A system as recited by claim 4, wherein identifying an event comprises:
   identifying a set of text associated with the event; and
   comparing the set of text with at least one keyword.

32. A system as recited by claim 31, wherein comparing the set of text with at least one keyword comprises:
   receiving at the monitored computer a regular expression that is satisfied by the keyword and a package comprising the at least one keyword and a set of at least one hash value generated from the keyword;
   evaluating the set of text against the regular expression to determine whether at least a portion of the set of text satisfies the regular expression;
   based on an evaluation of the set of text against the regular expression, generate a text hash from the at least a portion of the set of text;
   compare the text hash to the at least one hash value;
   based on a comparison of the text hash with the at least one hash value, identify the event as an event requiring monitoring.

33. The system of claim 4, wherein assigning at least one score to the plurality of events comprises:
   determining content of the plurality of events that should be scored; and
   creating a numeric score for the content that is determined should be scored.

34. A method of monitoring events on a monitored computer, the method comprising:
   monitoring, with a software agent on the monitored computer, a plurality of events occurring on the monitored computer;
   for each of the monitored events:
      a) generating a hash value corresponding to the monitored event;
      b) searching an event cache for an existing hash value matching the generated hash value;
      c) if an existing hash value matching the generated hash value is found in the event cache, storing the generating hash value in the event cache as a representation of the monitored event;
      d) if no existing hash value matching the generated hash value is found in the event cache, storing a copy of the monitored event, along with the generated hash value, in the event cache as a representation of the monitored event;
   identifying one of the plurality of events as an event of interest, the identifying comprising:
      analyzing each of the plurality of events against one or more rules defining characteristics of events that should be collected;
      assigning at least one score to the plurality of events based on the analysis of the plurality of events;
      comparing the at least one score assigned to the plurality of events with one or more thresholds; and
      identifying one of the plurality of events on the monitored computer as the event of interest based on the comparison;
   determining a window of interest prior in time to the event of interest, such that events falling within the window of interest should be collected;
   identifying, from the plurality of events, one or more events falling within the window of interest; and
   queuing the representation of the event of interest and the one or more events falling within the window of interest for transmission to a monitoring computer.

35. The method recited by claim 34, wherein the software agent is configured such that actions performed by the software event are not detectible by a user of the monitored computer.

36. The method of claim 34, wherein assigning at least one score to the plurality of events based on the analysis of the plurality of events comprises:
   determining content of the plurality of events that should be scored; and
   creating a numeric score for the content that is determined should be scored.

37. One or more computer-readable non-transitory storage media embodying software this is operable when executed by one or more computer systems to:
   monitor a plurality of events occurring on the computer;

for each of the plurality of events:
  generate an identifier corresponding to the event;
  search an event cache for an existing identifier matching the generated identifier;
  store a copy of the event as a representation of the event if an existing identifier matching the generated identifier is not found in the search of the event cache; and
  store the generated identifier as the representation of the event if an existing identifier matching the generated identifier for the event is found in the search of the event cache;
analyze each of the plurality of events against one or more rules defining characteristics of events that should be collected and, based on the analysis of the plurality of events, assign at least one score to the plurality of events;
compare the at least one score assigned to the plurality of events with one or more thresholds, and, based on the comparison, identify one of the plurality of events on the computer as an event of interest;
determine that a set of one or more events occurring prior in time to the event of interest should be collected;
specify a window of interest prior in time to the event of interest, such that events occurring during the window of interest should be collected;
identify, from the plurality of events, one or more events falling within the window of interest; and
queue, for transmission to a second computer, the representations of the event of interest and each of the one or more events falling within the window of interest.

38. The computer software program recited by claim 37, wherein the computer software program is configured not to be detectible by a user of the computer.

39. The computer software program of claim 37, wherein assigning at least one score to the plurality of events comprises:
  determining content of the plurality of events that should be scored; and
  creating a numeric score for the content that is determined should be scored.

* * * * *